United States Patent
Harris et al.

[11] Patent Number: 5,985,198
[45] Date of Patent: *Nov. 16, 1999

[54] METHOD FOR MOLDING A FILM-COVERED ARTICLE

[75] Inventors: Mark Alan Harris, Dexter; Dale Moore, Plymouth; Zinoviy Chernyak, Farmington Hills, all of Mich.

[73] Assignee: Ford Motor Company, Dearborn, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/903,364

[22] Filed: Jul. 30, 1997

[51] Int. Cl.⁶ .................................... B29C 45/14
[52] U.S. Cl. .................. 264/255; 264/266; 264/267; 264/268; 264/269; 264/276; 264/291
[58] Field of Search ................. 264/266, 269, 264/265, 322, 267, 291, 255, 276, 268; 475/112, 129.1, 571

[56] References Cited

U.S. PATENT DOCUMENTS

| | | |
|---|---|---|
| 3,122,598 | 2/1964 | Berger ................ 264/265 |
| 3,668,034 | 6/1972 | Nicholas et al. . |
| 4,076,790 | 2/1978 | Lind ................ 264/266 |
| 4,650,533 | 3/1987 | Parker et al. . |
| 4,769,100 | 9/1988 | Short et al. . |
| 4,902,557 | 2/1990 | Rohrbacher . |
| 4,913,760 | 4/1990 | Benson et al. . |
| 4,976,896 | 12/1990 | Short et al. . |
| 5,034,077 | 7/1991 | Pata . |
| 5,034,269 | 7/1991 | Wheeler . |
| 5,037,680 | 8/1991 | Papendick et al. . |
| 5,055,346 | 10/1991 | Rohrbacher . |
| 5,114,789 | 5/1992 | Reafler . |
| 5,125,994 | 6/1992 | Harasta et al. . |
| 5,192,609 | 3/1993 | Carroll, Jr. . |
| 5,208,081 | 5/1993 | Gübitz et al. . |
| 5,215,811 | 6/1993 | Reafler et al. . |
| 5,215,826 | 6/1993 | Shimanski et al. . |
| 5,248,364 | 9/1993 | Liu et al. . |
| 5,271,352 | 12/1993 | Wilson . |
| 5,342,666 | 8/1994 | Ellison et al. . |
| 5,350,473 | 9/1994 | Weder et al. . |
| 5,435,865 | 7/1995 | Lee et al. . |
| 5,514,427 | 5/1996 | Ellison et al. . |
| 5,536,539 | 7/1996 | Ellison et al. . |
| 5,538,576 | 7/1996 | Knop et al. . |
| 5,585,187 | 12/1996 | Shinonaga et al. . |
| 5,599,608 | 2/1997 | Yamamoto et al. . |

FOREIGN PATENT DOCUMENTS

| | | |
|---|---|---|
| 5-131496 | 5/1993 | Japan . |
| 2 185 708 | 7/1987 | United Kingdom . |

*Primary Examiner*—Jan H. Silbaugh
*Assistant Examiner*—Edmund H. Lee
*Attorney, Agent, or Firm*—Damian Porcari

[57] ABSTRACT

A method for manufacturing a film-coated article by the following steps. A pre-molded film having a backing surface and a decorative surface is formed in the shape of the molded article. The film includes an opening that allows the molted plastic to pass through the film. The film is placed within a mold press having a mold with a cavity surface and a movable core. The mold includes an resin inlet with an inlet surface. The film is placed on the mold with the decorative surface juxtaposed the mold. The opening on the film overlies the resin inlet. The mold is closed and the film held securely in place against the inlet surface. A molten plastic material is injected through the resin inlet. The plastic material passes through the film and fuses to the backing surface. After the article has cooled, the press is opened. The molded article is retained on the core and removed from the press.

1 Claim, 3 Drawing Sheets

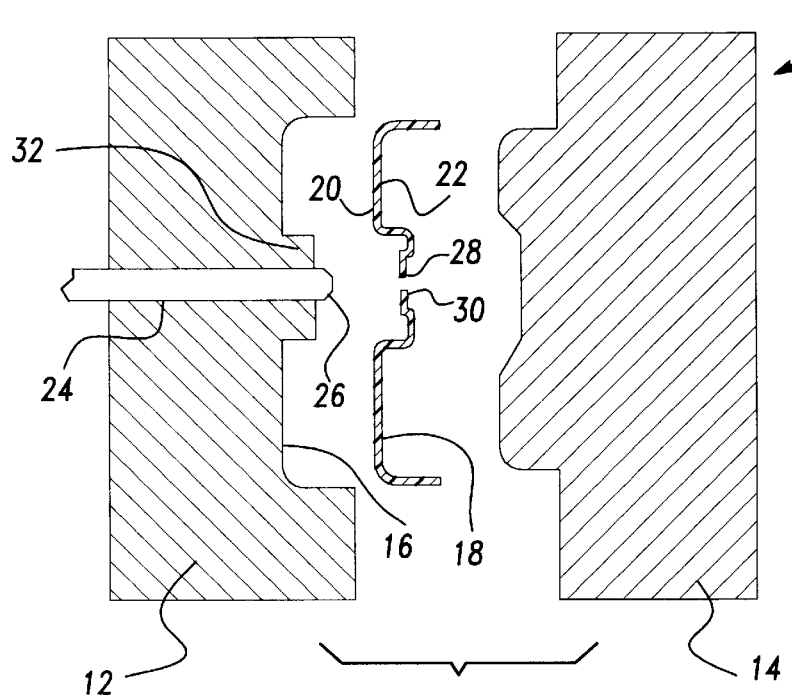
*Fig-1*
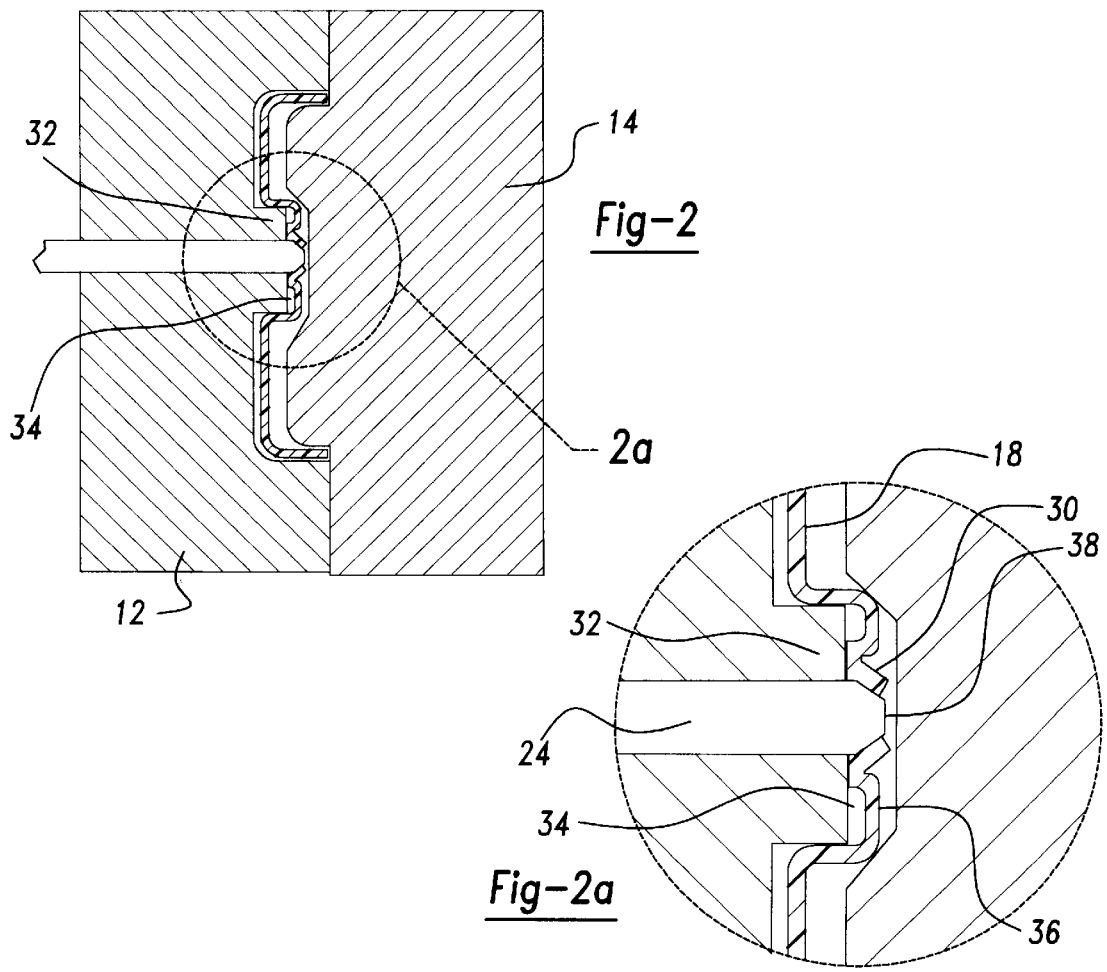
*Fig-2*
*Fig-2a*

METHOD FOR MOLDING A FILM-COVERED ARTICLE

BACKGROUND OF THE INVENTION

1. Field of the Invention

The present invention relates to a method for molding a film-covered article. More specifically, the invention relates to a method and apparatus that enables a stationary resin inlet to inject a plastic material behind a pre-molded flexible film.

2. Description of the Related Arts

It is known to manufacture molded articles by a method called in-mold film laminates. The method is described in U.S. Pat. No. 3,668,034 ('034). The '034 patent teaches placing a decorative laminate within a mold and then injection molding a polymeric material behind the laminate. The resin inlet is juxtaposed the laminate backing. The polymeric material heats, softens and finally fuses to the backing on the laminate.

There are several problems arising from injecting molten plastic from the cavity surface opposite the film decorative surface. Is it generally desirable to use a stationary cavity and a movable core. The part is retained on the core after molding and is easily removed when the press is opened. The resin inlet is preferably placed in the cavity. The resin inlet is almost always stationary because it is connected to an auger feeding molten plastic material. It is desirable to place the resin inlet in the cavity because the cavity has many fewer moving parts than the core and it is easier to remove the part from the core than from the cavity.

It is also possible to use edge gating to supply molten plastic behind the film. In edge gating, plastic is injected around the edge of the film either through the cavity or the core. Edge gating only allows the gate to be placed a short distance from the edge of the part. The central area of large parts is not reached by edge gating. Additionally, edge gating leave a substantial core plug that must be trimmed and removed from the runners by pins or other means. Extended lengths of edge gating are difficult to maintain and often require heated runners and gate valves.

Heretofore, in-mold film laminates have been manufactured using movable cavities and stationary cores as illustrated in U.S. Pat. No. 5,514,427 ('427). The '427 patent teaches a press having a stationary core. The resin inlet is placed within the core and injects molten plastic material behind the film. The '427 patent does not teach how the finished molded article is removed from the press. U.S. Pat. No. 5,599,608 similarly teaches a movable core having a resin inlet injecting plastic behind the film.

It is desirable to provide a method and apparatus for injecting molten plastic through the cavity. It is further desirable to provide a mold press for in-mold film laminates that retains the finished molded article on a moveable core. Finally, it is desirable to provide method for sealing the film and resin inlet so that molten plastic does not flow to the decorative surface of the film.

These deficiencies and problems are overcome by the present invention.

SUMMARY OF THE INVENTION

The present invention relates to a method of manufacturing a film-coated article by the following steps. A pre-molded film having a backing surface and a decorative surface is formed in the shape of the molded article. The film includes an opening that allows the molten plastic to pass through the film. The film is placed within a molding press having a mold having a cavity surface and a movable core. The mold includes an injection resin inlet with an inlet surface. The film is placed on the mold with the decorative surface juxtaposed the mold. The opening on the film overlies the resin inlet. The mold is closed and the film held securely in place against the inlet surface. A molten plastic material is injected through the resin inlet. The plastic material passes through the film and fuses to the backing surface. After the article has cooled, the press is opened. The molded article is retained on the core and removed from the press.

The film includes a sealing surface that prevents the passage of molten plastic to the decorative surface. The film may include an opening slightly smaller than the diameter of the resin inlet. Alternatively, the film may include an angled portion that is compressed between the mold and core to urge the perimeter of the opening against the resin inlet. In either construction, plastic is directed to the film backing surface through the opening.

In addition to method described above, the present invention also includes an apparatus for manufacturing a film-coated article. The apparatus includes a mold press being movable between open and closed positions. The press includes a mold having a cavity surface and a moveable core. The mold includes a molten polymer resin inlet therein. The film is placed within the mold with the decorative surface juxtaposed the mold. The resin inlet is aligned with an opening in the film. The resin inlet has a surface sealing the opening of the film from molten plastic injected through the resin inlet.

The present invention enables the use of traditional molds with cavity surfaces and moveable cores by injecting the molten plastic through the film. Because the molded article is retained on the core, existing unloading equipment may be utilized to remove the article from the mold. By placing the resin inlet on the mold, the invention greatly facilitates the manufacture of large complex articles that require molding equipment with movable slides. These slides may be placed on the core as is customary for large molds. The complexity of the slides leaves little room for the resin inlet. The mold usually does not contain movable parts and therefore has more room to accept the resin inlet.

These and other desired objects of the present invention will become more apparent in the course of the following detailed description and appended claims. The invention may best be understood with reference to the accompanying drawings wherein illustrative embodiments are shown.

BRIEF DESCRIPTION OF THE DRAWINGS

FIG. 1 is a cross-sectional view of a mold press in the open position.

FIG. 2 is a cross-sectional view of the mold press shown in FIG. 1 is a closed position.

FIG. 2a is a detailed view of the area marked A in FIG. 2 prior to injection molding.

DETAILED DESCRIPTION OF THE PREFERRED EMBODIMENTS

Figure 2B:
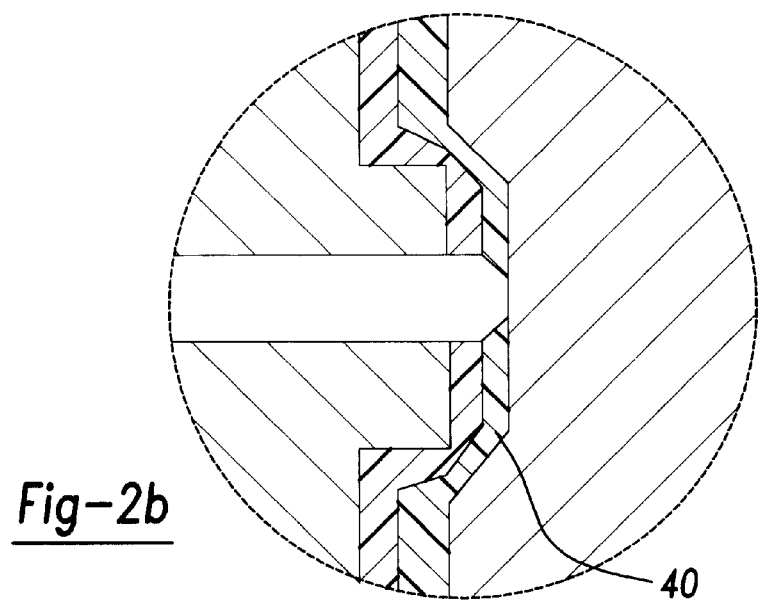
FIG. 2b is a detailed view of the aria marked A in FIG. 2 during injection molding.

The present invention will be described through a series of drawings, which illustrates a molding operation that molds a thin film into an automotive bumper fascia. The invention may also be used with thicker films for use in instrument panels and door panels. Other components may be manufactured using the same or similar technique and equipment and are included within the invention described herein.

FIG. 1 illustrates a mold press 10 in the open position. The mold press 10 comprises a mold with a cavity surface 12 and a movable core 14. The mold 12 has a cavity surface 16 that mates with a thin-flexible film 18. The film 18 is pre-molded in the shape of the final article and includes a decorative surface 20 and a backing surface 22. The decorative surface 20 may be painted, coated with another material such as metal foil, vinyl or other applique. The backing surface 22 may be polymeric material used to make the film 18 or alternatively may include an adhesion promoter or adhesive.

The film 18 is placed between the mold 12 and the core 14 and a plastic material is injected against the backing surface 22. The mold 12 includes a cylindrical polymer injection resin inlet 24. The resin inlet 24 is of conventional construction and includes a hemispherical surface 26. The film 18 includes an opening 28 aligned with the surface 26. Surrounding the opening 28 is a perimeter 30. The perimeter 30 engages and seals with the surface 26 when the press 10 is moved to the closed position as shown in FIGS. 2, 2a and 2b.

The opening 28 is usually located in an area of the article that is cutout or covered. In the embodiment illustrated in FIGS. 1–3, the opening 28 is formed in a recess. A raised shoulder 32 on the cavity surface 16 forms a recess area 34 on the film 18. The film 18 includes angled portions 36. The angled portions 36 are formed when the film 18 is thermoformed. The angled portions 36 have a width greater than then space between the cavity 12 and the core 14 when the press 10 is in the closed position. The core 14 engages the angled portions 36 and urges perimeter 30 against the surface 26 as shown in FIG. 2a. The angled portions 36 act like a spring that is compressed between the cavity 12 and the core 14 and retain the film 18 in proper position. The core 14 includes a recessed portion 38 opposite the resin inlet 24.

A molten plastic material is injected through the resin inlet 24 and through the film 18 as shown in FIG. 2b. The plastic material 40 flows into the recess portion 38. As the plastic material 40 flows between the cavity 12 and the core 14, it urges the film 18 against the cavity surface 16. The perimeter 30 is tightly sealed against the surface 26 and no molten plastic material flows between the cavity surface 16 and the decorative surface 20.

Figure 3:
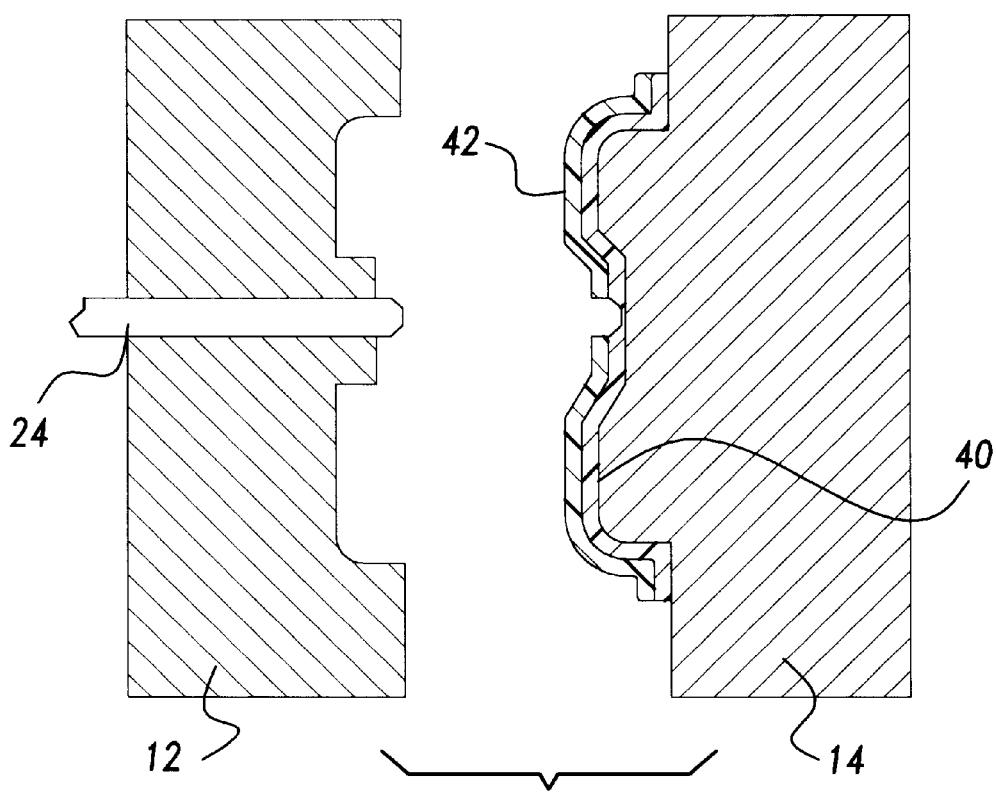
FIG. 3 is a cross-sectional view of the mold press shown in FIG. 1 after molding an article.

The molten plastic material 40 heats, softens and fuses with the backing surface 22 to form the finished molded article 42 as illustrated in FIG. 3. The article 42 cools and hardens and the press 10 opened. The core 14 is moved away from the mold 12. The article 42 remains on the core 14 until it is removed.

Figure 4:
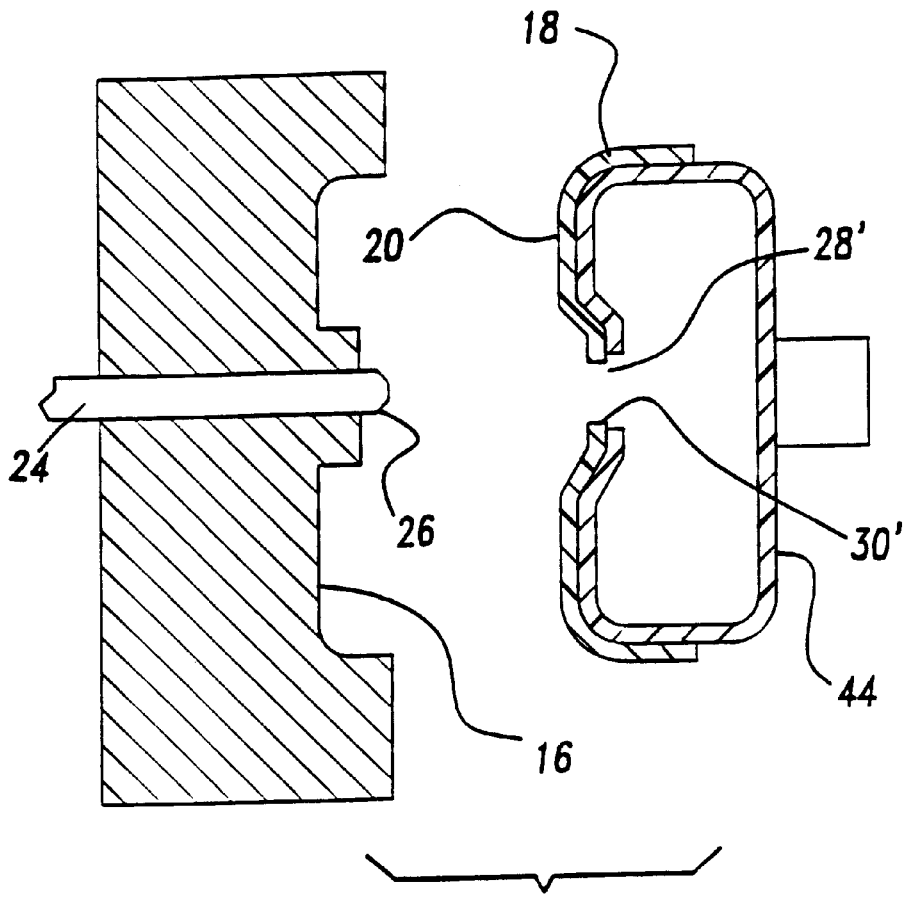
FIG. 4 is a cross-sectional view of an alternative embodiment of the present invention.
Figure 5:
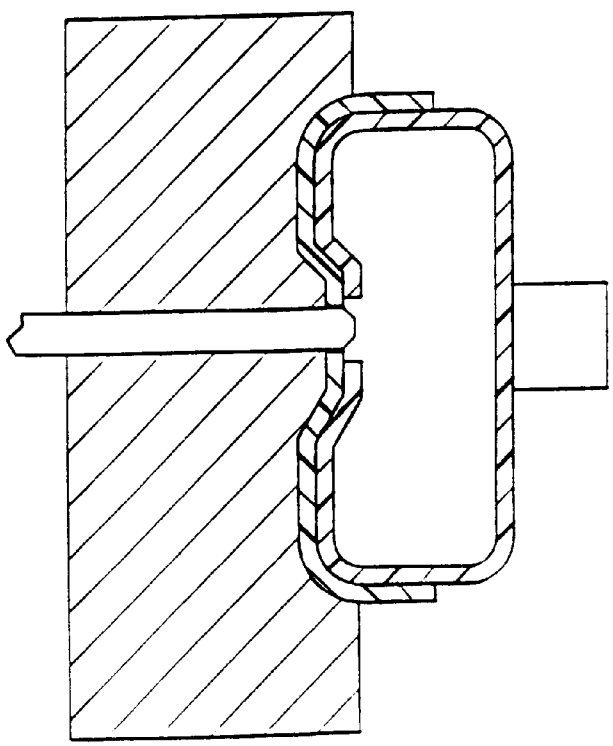
FIG. 5 is a cross-sectional view of the embodiment illustrated in FIG. 4 positioning the film over the resin inlet.

Illustrated in FIGS. 4–5 is an alternative embodiment of the present invention. In the embodiment illustrated in FIG. 4, opening 28' is formed to have a perimeter edge 30' slightly smaller than the diameter of the resin inlet shoulder 26. The resin inlet 24 extends beyond the surface of the cavity surface 16. In this alternative embodiment, the film 18 is forced over the resin inlet 38. A loader 44 places the film 18 against the cavity surface 16 and urges the perimeter edge 30' over resin inlet shoulder 26 and positions the perimeter edge 30' below the resin inlet 24. A loader 44 useful for the present invention is illustrated in co-pending application attorney docket no. 197-0410, titled: METHOD AND APPARATUS FOR TRANSFERRING A PRE-MOLDED FILM INTO A MOLD, and incorporated herein by reference. The perimeter edge 30' stretches slightly as it passes over the resin inlet 38. The film 18 is sealed tightly around the resin inlet shoulder 32 to prevent any plastic material from passing between the cavity surface 16 and the decorative surface 20. In this embodiment, the perimeter edge 30' is not in the plastic material 40 flow front. The plastic material 40 passes above the perimeter edge 30'.

It is thus seen that the objects of this invention have been fully and effectively accomplished. It will be realized, however, that the foregoing preferred embodiments have been shown and described for the purpose of illustrating the functional and structural principles of this invention and are subject to change and modification by those skilled in the art without departing from the principles described. Therefore, this invention includes all modifications encompassed within the spirit and scope of the following claims:

What is claimed:

1. A method of manufacturing a film covered article comprising the steps of:

providing a molding press having a mold with a cavity surface and a core, said mold having a resin inlet extending therethrough, said resin inlet extending beyond said cavity surface to define a resin inlet shoulder;

providing a pre-molded film having a backing surface and a decorative surface, said film having an opening therethrough, said opening having a perimeter edge, the diameter of the perimeter edge being smaller than the diameter of said resin inlet shoulder;

placing said pre-molded film into said press with said decorative surface against said cavity surface while passing said perimeter edge of the film opening over said resin inlet shoulder thereby stretching said perimeter edge of the film opening as said perimeter edge of the film opening passes over said resin inlet shoulder, said perimeter edge of the film opening sealing tightly around said resin inlet shoulder;

closing said press; and subsequent to said stretching step, injecting a molten plastic material through said resin inlet, said plastic material flowing between said film and said core and fusing to said backing surface to form said article, whereby the film being tightly sealed around the resin inlet shoulder prevents any molten plastic material from passing between said cavity surface and said decorative surface.

* * * * *